US012040149B2

(12) United States Patent
Hayashida et al.

(10) Patent No.: US 12,040,149 B2
(45) Date of Patent: Jul. 16, 2024

(54) RELAY

(71) Applicant: OMRON Corporation, Kyoto (JP)

(72) Inventors: Yasuo Hayashida, Kumamoto (JP); Ryota Minowa, Yamaga (JP); Shingo Mori, Yamaga (JP); Naoki Kawaguchi, Yame (JP); Kohei Otsuka, Omuta (JP); Hiroyuki Iwasaka, Kumamoto (JP)

(73) Assignee: OMRON CORPORATION, Kyoto (JP)

( * ) Notice: Subject to any disclaimer, the term of this patent is extended or adjusted under 35 U.S.C. 154(b) by 256 days.

(21) Appl. No.: 17/421,726

(22) PCT Filed: Nov. 18, 2019

(86) PCT No.: PCT/JP2019/045004
§ 371 (c)(1),
(2) Date: Jul. 9, 2021

(87) PCT Pub. No.: WO2020/148995
PCT Pub. Date: Jul. 23, 2020

(65) Prior Publication Data

US 2022/0093355 A1 Mar. 24, 2022

(30) Foreign Application Priority Data

Jan. 18, 2019 (JP) ................................ 2019-006528

(51) Int. Cl.
*H01H 50/34* (2006.01)
*H01H 50/54* (2006.01)

(52) U.S. Cl.
CPC .......... *H01H 50/34* (2013.01); *H01H 50/546* (2013.01)

(58) Field of Classification Search
CPC ...... H01H 50/34; H01H 50/546; H01H 1/502; H01H 50/58; H01H 1/54
(Continued)

(56) References Cited

U.S. PATENT DOCUMENTS 4,251,788 A * 2/1981 Barthruff ............ H01H 51/065 335/157
5,677,656 A * 10/1997 Mauch ................ H01H 51/065 335/131
(Continued)

FOREIGN PATENT DOCUMENTS

JP 2014-157829 A 8/2014
JP 2017-33952 A 2/2017
(Continued)

OTHER PUBLICATIONS

International Search Report of International Application No. PCT/JP2019/045004 issued on Feb. 4, 2020.
(Continued)

*Primary Examiner* — Shawki S Ismail
*Assistant Examiner* — Lisa N Homza
(74) *Attorney, Agent, or Firm* — SHINJYU GLOBAL IP

(57) ABSTRACT

A first yoke is arranged in a contact direction with respect to a movable contact piece. A second yoke is arranged in an opening direction with respect to the movable contact piece. The first yoke and the second yoke are configured to generate a magnetic force that attracts the first yoke and the second yoke to each other when the movable contact contacts the fixed contact and is energized. The first yoke and the second yoke are arranged not to contact each other so that the movable contact piece can contact the fixed terminal in a state where the movable contact and the fixed contact are lost.

5 Claims, 12 Drawing Sheets

(58) Field of Classification Search
USPC .......................................................... 335/195
See application file for complete search history.

(56) References Cited

U.S. PATENT DOCUMENTS 5,892,194 A * 4/1999 Uotome ............... H01H 51/065 335/154
5,892,422 A * 4/1999 Montaigu ............ H01H 51/065 335/131
5,909,067 A * 6/1999 Liadakis .............. H01H 51/065 290/38 A
6,700,466 B1 * 3/2004 Yamamoto ............. H01H 9/302 335/201
6,911,884 B2 * 6/2005 Uotome ................. H01H 50/36 335/132
7,859,373 B2 * 12/2010 Yamamoto ........... H01H 50/546 335/131
7,911,304 B2 * 3/2011 Yano ...................... H01H 50/38 335/229
8,138,863 B2 * 3/2012 Tanaka ................... H01H 50/38 335/131
8,138,872 B2 * 3/2012 Yoshihara ............. H01F 7/1615 335/185
8,179,217 B2 * 5/2012 Kawaguchi ........ H01H 51/2209 335/85
8,193,882 B2 * 6/2012 Murata ................. F02N 15/067 335/131
8,198,964 B2 * 6/2012 Yoshihara ............. H01H 51/29 335/131
8,289,110 B2 * 10/2012 Niimi .................... F02N 11/087 335/126
8,653,917 B2 * 2/2014 Takaya ................... H01H 9/443 335/131
8,941,453 B2 * 1/2015 Yano ...................... H01H 51/00 335/277
2009/0322454 A1 * 12/2009 Tanaka ................... H01H 50/38 335/189
2013/0021121 A1 * 1/2013 Uchida ................ H01H 50/546 335/131
2015/0015350 A1 * 1/2015 Tachikawa ........... H01H 50/541 335/131
2015/0022291 A1 * 1/2015 Kashimura .............. H01H 9/46 218/148
2015/0022292 A1 * 1/2015 Tachikawa ........... H01H 50/641 335/131
2015/0077202 A1 3/2015 Enomoto et al.
2016/0155592 A1 6/2016 Ito et al.
2019/0035586 A1 1/2019 Ito et al.
2019/0131093 A1 * 5/2019 Minowa ................. H01H 50/20
2020/0286702 A1 * 9/2020 Kodama ................ H01H 50/60
2020/0381203 A1 * 12/2020 Sakaguchi ............. H01H 50/42
2021/0151271 A1 * 5/2021 Kodama ................ H01H 50/54
2021/0398763 A1 * 12/2021 Kawaguchi ............ H01H 50/42
2022/0093355 A1 * 3/2022 Hayashida ........... H01H 50/546
2023/0207243 A1 * 6/2023 Yamakawa ............ H01H 50/18 335/203

FOREIGN PATENT DOCUMENTS

JP 6358442 B2 7/2018
WO 2013153799 A1 10/2013

OTHER PUBLICATIONS

Written Opinion of the International Searching Authority of International Application No. PCT/JP2019/045004 issued on Feb. 4, 2020.

* cited by examiner

RELAY

CROSS-REFERENCE TO RELATED APPLICATION

This application is the U.S. National Phase of International Application No. PCT/JP2019/045004, filed on Nov. 18, 2019. This application claims priority to Japanese Patent Application No. 2019-006528, filed Jan. 18, 2019. The contents of those applications are incorporated by reference herein in their entireties.

FIELD

The present invention relates to a relay.

BACKGROUND

There is a relay that includes a movable contact piece, a fixed terminal, and a drive device. The movable contact piece includes a movable contact. The fixed terminal includes a fixed contact. The movable contact is arranged to face the fixed contact. The drive device moves the movable contact piece in a contact direction and an opening direction. As the movable contact piece moves in the contact direction, the movable contact contacts the fixed contact. As the movable contact piece moves in the opening direction, the movable contact is separated from the fixed contact.

When the movable contact contacts the fixed contact, an electric current flows between the movable contact and the fixed contact. At this time, an electromagnetic repulsive force is generated between the movable contact and the fixed contact due to the current flowing between the movable contact and the fixed contact. The electromagnetic repulsive force acts in the direction of opening the movable contact and the fixed contact. Therefore, the contact pressure between the movable contact and the fixed contact is reduced by the electromagnetic repulsive force.

Therefore, in the electromagnetic relay described in Publication of Japan Patent No. 6358442, an upper yoke and a lower yoke are provided. The upper yoke is located above the movable contact piece. The lower yoke is located below the movable contact piece. When an electric current flows between the movable contact and the fixed contact, the upper yoke and the lower yoke form a magnetic circuit to generate a magnetic force that attracts the upper yoke and the lower yoke to each other. Thereby, the contact pressure between the movable contact and the fixed contact can be improved against the electromagnetic repulsive force.

SUMMARY

If an overcurrent flows between the fixed contact and the movable contact, the fixed contact and the movable contact may melt and be lost. In that case, if the movable contact piece further moves in the contact direction and the movable contact piece contacts the fixed terminal, energization between the movable contact piece and the fixed terminal can be ensured. However, in the above electromagnetic relay, the upper yoke and the lower yoke are arranged so as to face each other. Therefore, when the fixed contact and the movable contact are lost due to an overcurrent, the lower yoke contacts the upper yoke, and the movement of the movable contact piece in the contact direction is restricted. Therefore, when the fixed contact and the movable contact are lost, it is not possible to secure the energization between the movable contact piece and the fixed terminal.

An object of the present invention is to improve the contact pressure of contacts by a yoke in a relay and to secure energization between a movable contact piece and a fixed terminal even if the contacts are lost.

A relay according to one aspect includes a movable contact piece, a fixed terminal, a drive device, a first yoke, and a second yoke. The movable contact piece includes a movable contact. The fixed terminal includes a fixed contact. The fixed contact is arranged to face the movable contact. The drive device moves the movable contact piece in a contact direction and an opening direction. The contact direction is a direction in which the movable contact is close to the fixed contact. The opening direction is a direction in which the movable contact is separated from the fixed contact. The first yoke is arranged in the contact direction with respect to the movable contact piece. The second yoke is arranged in the opening direction with respect to the movable contact piece. The first yoke and the second yoke are configured to generate a magnetic force that attracts the first yoke and the second yoke to each other when the movable contact contacts the fixed contact and is energized. The first yoke and the second yoke are arranged not to contact each other so that the movable contact piece can contact the fixed terminal in a state where the movable contact and the fixed contact are lost.

In the relay according to the present aspect, the first yoke and the second yoke generate the magnetic force that attract each other. Therefore, the movable contact piece is pressed in the contact direction. Thereby, the contact pressure of the contacts can be improved. Further, the first yoke and the second yoke are arranged not to contact each other so that the movable contact piece can contact the fixed terminal in a state where at least one of the movable contact and the fixed contact is lost. Therefore, even if at least one of the movable contact and the fixed contact is lost, the energization of the movable contact piece and the fixed terminal can be ensured.

In the moving direction of the movable contact piece, a distance between the first yoke and the second yoke when the movable contact contacts the fixed contact may be larger than a sum of lengths of the fixed contact and the movable contact. In this case, since the second yoke is far away from the first yoke, the movement of the movable contact piece in the contact direction is not restricted by the first yoke and the second yoke. As a result, when the fixed contact and the movable contact are lost, the movable contact piece can contact the fixed terminal.

The second yoke may be arranged so as to be separated from the first yoke when the movable contact and the fixed contact are lost and the movable contact piece contacts the fixed terminal. In this case, when the movable contact and the fixed contact are lost and the movable contact piece contacts the fixed terminal, the movement of the movable contact piece in the contact direction is not restricted by the first yoke and the second yoke. As a result, when the fixed contact and the movable contact are lost, the movable contact piece can contact the fixed terminal.

The second yoke may include a first wall portion and a second wall portion. The first wall portion and the second wall portion may be arranged apart from each other. When the movable contact and the fixed contact are lost and the movable contact piece contacts the fixed terminal, the first yoke may be arranged so as to be located between the first wall portion and the second wall portion. In this case, since the first yoke enters between the first wall portion and the second wall portion of the second yoke, the movement of the movable contact piece in the contact direction is not restricted by the first yoke and the second yoke. As a result, when the fixed contact and the movable contact are lost, the movable contact piece can contact the fixed terminal.

The first wall portion and the second wall portion may be arranged apart from each other in a first direction perpendicular to the moving direction of the movable contact piece. In the first direction, the first yoke may be smaller than the distance between the first wall and the second wall. In this case, since the first yoke enters between the first wall portion and the second wall portion, the movement of the movable contact piece in the contact direction is not restricted by the first yoke and the second yoke. As a result, when the fixed contact and the movable contact are lost, the movable contact piece can contact the fixed terminal.

DETAILED DESCRIPTION

Figure 1:
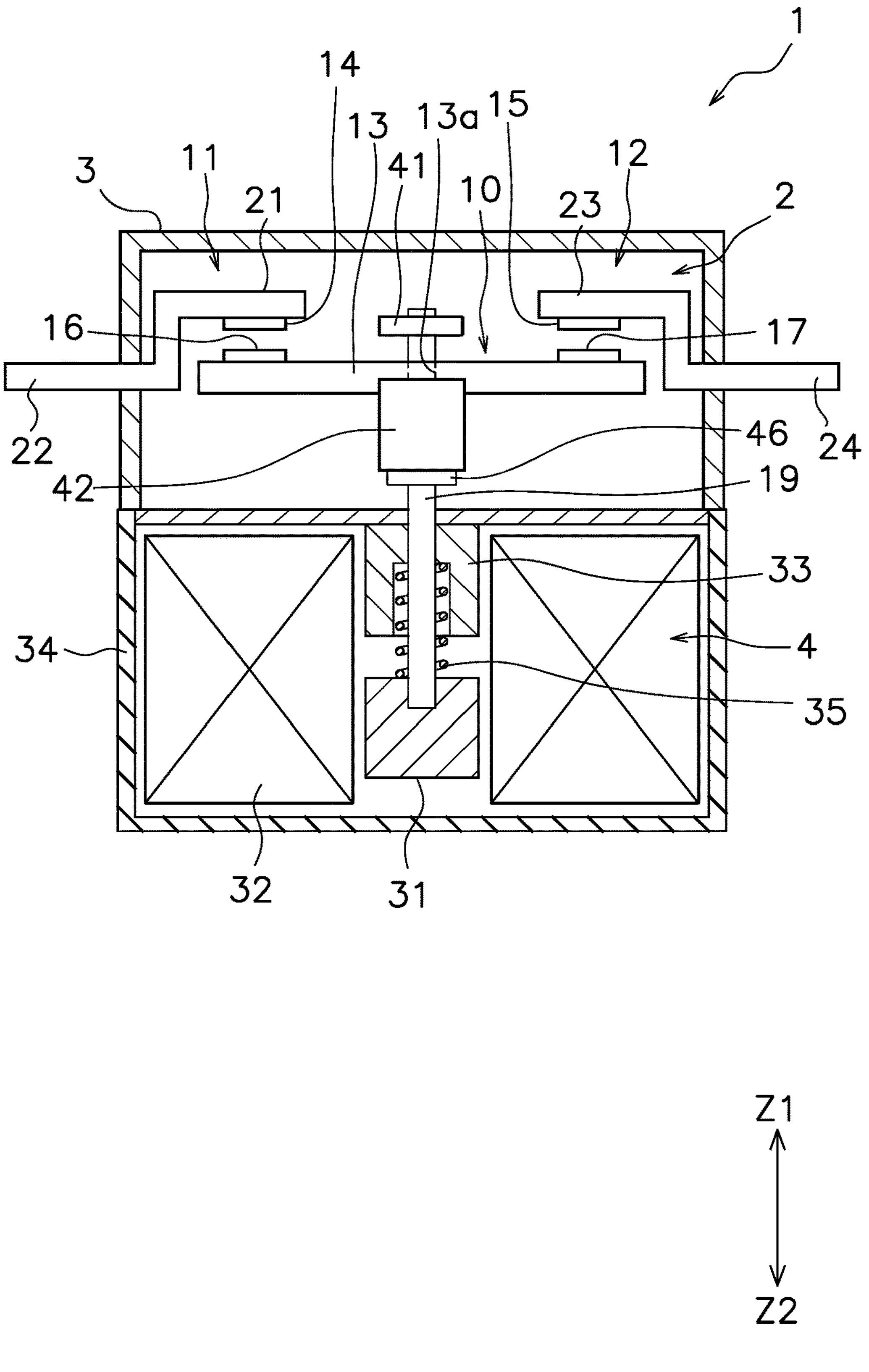
FIG. 1 is a side view showing a relay in an open state according to an embodiment.

Hereinafter, a relay 1 according to an embodiment will be described with reference to the drawings. FIG. 1 is a side view showing the relay 1 according to the embodiment. As illustrated in FIG. 1, the relay 1 includes a contact device 2, a housing 3, and a drive device 4.

In the following description, each direction of up/down/left/right means each direction of up/down/left/right in FIG. 1. Specifically, a direction from the drive device 4 to the contact device 2 is defined as upward. Further, a direction from the contact device 2 to the drive device 4 is defined as downward. In FIG. 1, a direction that intersects in the vertical direction is defined as a left-right direction. Further, a direction that intersects the vertical direction and the left-right direction is defined as a front-rear direction. The front-rear direction is a direction perpendicular to the paper surface of FIG. 1. However, these directions are defined for convenience of explanation, and do not limit the arrangement direction of the relay 1.

The contact device 2 is arranged in the housing 3. The contact device 2 includes a first fixed terminal 11, a second fixed terminal 12, a movable contact piece 10, and a drive shaft 19. The first fixed terminal 11 and the second fixed terminal 12 are made of a conductive material such as copper.

The first fixed terminal 11 includes a first fixed contact 14, a first contact support portion 21, and a first external terminal portion 22. The first fixed contact 14 is connected to the first contact support portion 21. The first fixed contact 14 has a shape protruding from the first contact support portion 21. The first contact support portion 21 faces the movable contact piece 10. The first external terminal portion 22 is connected to the first contact support portion 21. The first external terminal portion 22 projects outward from the housing 3.

The second fixed terminal 12 includes a second fixed contact 15, a second contact support portion 23, and a second external terminal portion 24. The second fixed contact 15 is connected to the second contact support portion 23. The second fixed contact 15 has a shape protruding from the second contact support portion 23. The first fixed contact 14 and the second fixed contact 15 are arranged apart from each other in the left-right direction.

The second contact support portion 23 faces the movable contact piece 10. The second external terminal portion 24 is connected to the second contact support portion 23. The second external terminal portion 24 projects outward from the housing 3. Specifically, the first external terminal portion 22 and the second external terminal portion 24 project from the housing 3 in the left-right direction. However, the first external terminal portion 22 and the second external terminal portion 24 may protrude upward from the housing 3. Alternatively, the first external terminal portion 22 and the second external terminal portion 24 may protrude from the housing 3 in the front-rear direction.

The movable contact piece 10 is made of a conductive material such as copper. The movable contact piece 10 is movably arranged in a contact direction Z1 and an opening direction Z2. The contact direction Z1 is a direction in which the movable contact piece 10 is close to the first fixed terminal 11 and the second fixed terminal 12 (upward in FIG. 1). The opening direction Z2 is a direction in which the movable contact piece 10 is separated from the first fixed terminal 11 and the second fixed terminal 12 (downward in FIG. 1).

The movable contact piece 10 includes a contact piece main body 13, a first movable contact 16, and a second movable contact 17. The contact piece main body 13 extends in the left-right direction. In the present embodiment, a longitudinal direction of the contact piece main body 13 coincides with the left-right direction. The contact piece main body 13 is arranged so as to face the first contact support portion 21 of the first fixed terminal 11 and the second contact support portion 23 of the second fixed terminal 12 in the vertical direction.

The first movable contact 16 and the second movable contact 17 are connected to the contact piece main body 13. The first movable contact 16 and the second movable contact 17 have a shape protruding from the contact piece main body 13.

The first movable contact 16 and the second movable contact 17 are arranged apart from each other in the left-right direction. The first movable contact 16 faces the first fixed contact 14 in the vertical direction. The second movable contact 17 faces the second fixed contact 15 in the vertical direction.

The drive shaft 19 supports the movable contact piece 10. The drive shaft 19 is movably arranged in the contact direction Z1 and the opening direction Z2 together with the movable contact piece 10. The drive shaft 19 extends in the vertical direction. The movable contact piece 10 is provided with a hole 13*a*. The drive shaft 19 is inserted into the hole 13*a*. The movable contact piece 10 is movable relative to the drive shaft 19 in the contact direction Z1 and the opening direction Z2.

The drive device 4 operates the movable contact piece 10 by an electromagnetic force. The drive device 4 moves the drive shaft 19 in the contact direction Z1 and the opening direction Z2. As a result, the drive device 4 moves the movable contact piece 10 in the contact direction Z1 and the opening direction Z2. The drive device 4 includes a movable iron core 31, a coil 32, a fixed iron core 33, a yoke 34, and a return spring 35.

The movable iron core 31 is connected to the drive shaft 19. The movable iron core 31 is configured to move in the contact direction Z1 and the opening direction Z2. When the coil 32 is energized, the coil 32 generates an electromagnetic force that moves the movable iron core 31 in the contact direction Z1. The fixed iron core 33 is arranged so as to face the movable iron core 31. The return spring 35 is arranged between the movable iron core 31 and the fixed iron core 33. The return spring 35 urges the movable iron core 31 in the opening direction Z2.

The yoke 34 is arranged so as to surround the coil 32. The yoke 34 is arranged on a magnetic circuit generated by the coil 32. The yoke 34 is arranged above the coil 32, on the lateral side of the coil 32, and below the coil 32.

Next, the operation of the relay 1 will be described. When the coil 32 is not energized, the drive device 4 is not magnetized. In this case, the drive shaft 19 is pressed together with the movable iron core 31 in the opening direction Z2 by the elastic force of the return spring 35. Therefore, the movable contact piece 10 is located at the open position illustrated in FIG. 1. In this state, the movable contact piece 10 is also pressed in the opening direction Z2 via the drive shaft 19. The movable contact piece 10 is in the open position, and the first movable contact 16 and the second movable contact 17 are separated from the first fixed contact 14 and the second fixed contact 15.

When the coil 32 is energized, the drive device 4 is magnetized. In this case, the movable iron core 31 moves in the contact direction Z1 against the elastic force of the return spring 35 due to the electromagnetic force of the coil 32. As a result, the drive shaft 19 and the movable contact piece 10 both move in the contact direction Z1. As a result, the movable contact piece 10 moves to the closed position illustrated in FIG. 2. When the movable contact piece 10 is in the closed position, the first movable contact 16 and the second movable contact 17 contact the first fixed contact 14 and the second fixed contact 15, respectively.

When the current to the coil 32 is stopped and degaussed, the movable iron core 31 is pressed in the opening direction Z2 by the elastic force of the return spring 35. As a result, the drive shaft 19 and the movable contact piece 10 both move in the opening direction Z2. As a result, the first movable contact 16 and the second movable contact 17 are separated from the first fixed contact 14 and the second fixed contact 15, respectively.

Figure 2:
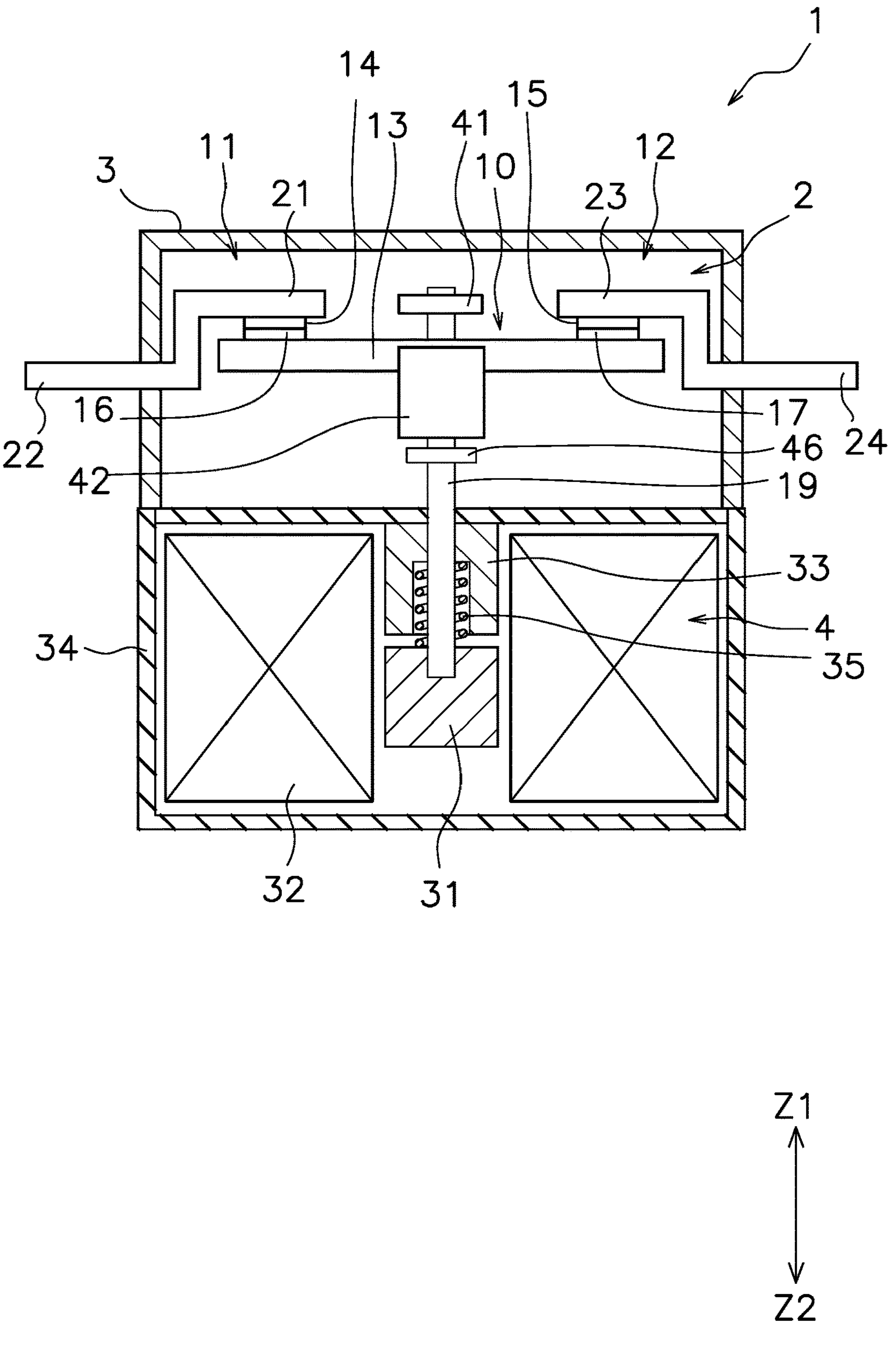
FIG. 2 is a side view showing the relay in a closed state.

As illustrated in FIGS. 1 and 2, the relay 1 includes a first yoke 41 and a second yoke 42. The first yoke 41 is arranged in the contact direction Z1 with respect to the movable contact piece 10. That is, the first yoke 41 is arranged above the movable contact piece 10. The second yoke 42 is arranged in the opening direction Z2 with respect to the movable contact piece 10. That is, the second yoke 42 is arranged below the movable contact piece 10. The first yoke 41 is fixed to the drive shaft 19. The second yoke 42 is configured to move relative to the drive shaft 19.

Figure 3B:
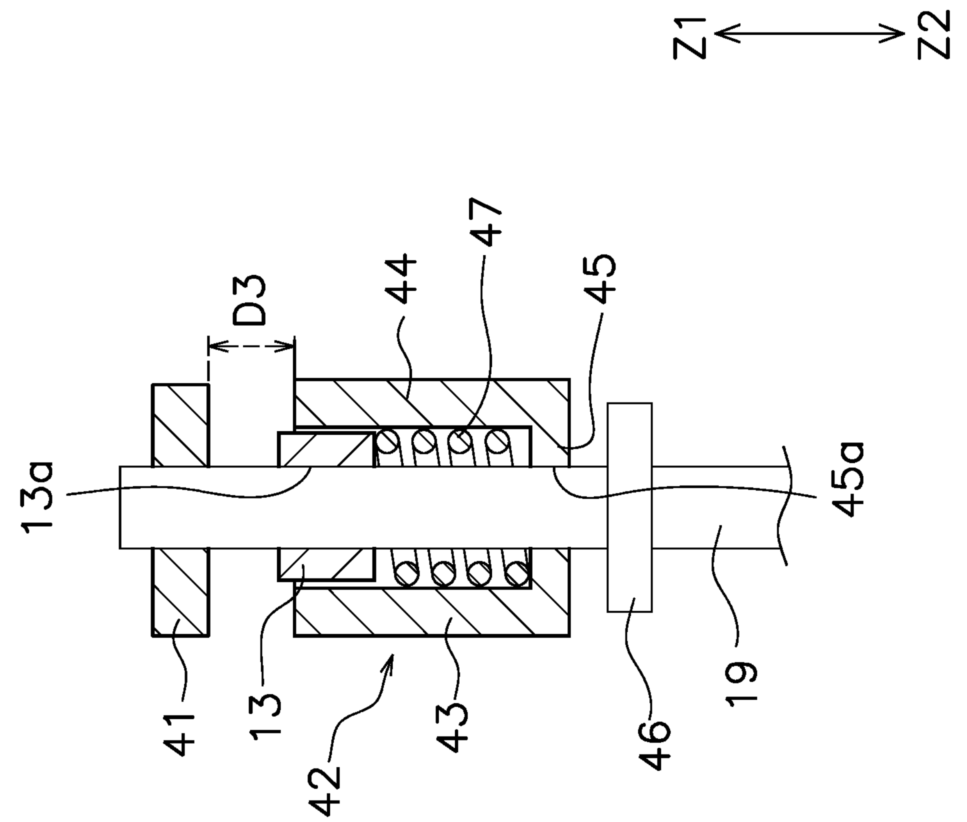
FIGS. 3A and 3B are cross-sectional views of a contact device as seen from a left-right direction.
Figure 3A:
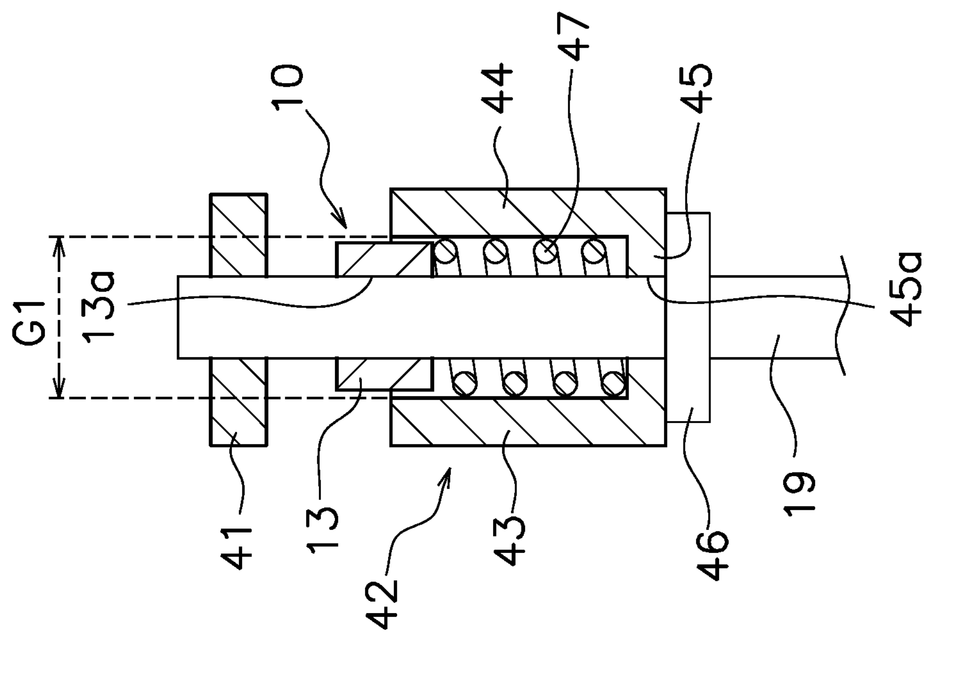

FIGS. 3A and 3B are cross-sectional views of the contact device 2 as viewed from the left-right direction. As illustrated in FIGS. 3A and 3B, the second yoke 42 includes a first wall portion 43, a second wall portion 44, and a bottom portion 45. The first wall portion 43 and the second wall portion 44 are arranged apart from each other in the front-rear direction. The front-rear direction is an example of a first direction perpendicular to the moving direction of the movable contact piece 10. The left-right direction may be defined as an example of a second direction perpendicular to the moving direction of the movable contact piece 10.

The movable contact piece 10 is arranged between the first wall portion 43 and the second wall portion 44 in the front-rear direction. The movable contact piece 10 is smaller than the gap G1 between the first wall portion 43 and the second wall portion 44 in the front-rear direction. Therefore, as illustrated in FIG. 3A, the movable contact piece 10 can be inserted into the gap G1 between the first wall portion 43 and the second wall portion 44.

The bottom portion 45 connects the lower part of the first wall portion 43 and the lower part of the second wall portion 44. The bottom portion 45 includes a hole 45*a*. The drive shaft 19 is inserted into the hole 45*a*. The drive shaft 19 includes a stopper 46. The stopper 46 is connected to the drive shaft 19. The stopper 46 may be integrated with the drive shaft 19. Alternatively, the stopper 46 may be provided separately from the drive shaft 19. The stopper 46 restricts the downward movement of the second yoke 42 with respect to the drive shaft 19.

In the front-rear direction, the gap G1 between the first wall portion 43 and the second wall portion 44 is smaller than that of the first yoke 41. In other words, in the front-rear direction, the first yoke 41 is larger than the gap G1 between the first wall portion 43 and the second wall portion 44. The first wall portion 43 and the second wall portion 44 are arranged below the first yoke 41. The first wall portion 43 and the second wall portion 44 face the first yoke 41 in the vertical direction. In other words, when viewed from the vertical direction, at least a part of the first wall portion 43 and the second wall portion 44 overlaps with the first yoke 41.

The relay 1 includes a spring 47. The spring 47 is arranged between the movable contact piece 10 and the second yoke 42. Specifically, the spring 47 is arranged between the bottom portion 45 of the second yoke 42 and the movable contact piece 10. The first yoke 41 and the second yoke 42 are configured to generate a magnetic force that attracts the first yoke 41 and the second yoke 42 to each other when the movable contacts 16 and 17 contact the fixed contacts 14 and 15 and are energized.

FIG. 3A shows a state in which the movable contacts 16 and 17 are in contact with the fixed contacts 14 and 15, and the first yoke 41 and the second yoke 42 are not attracted to each other. When the first yoke 41 and the second yoke 42 are attracted to each other by a magnetic force, the second yoke 42 moves upward as illustrated in FIG. 3B. At this time, since the movable contacts 16 and 17 contacts the fixed contacts 14 and 15, the movable contact piece 10 cannot move upward. Therefore, the spring 47 is compressed by the upward movement of the second yoke 42. The elastic force of the spring 47 pushes the movable contact piece 10 upward, that is, in the contact direction Z1. Thereby, the contact pressure of the contacts can be increased.

Figure 4:
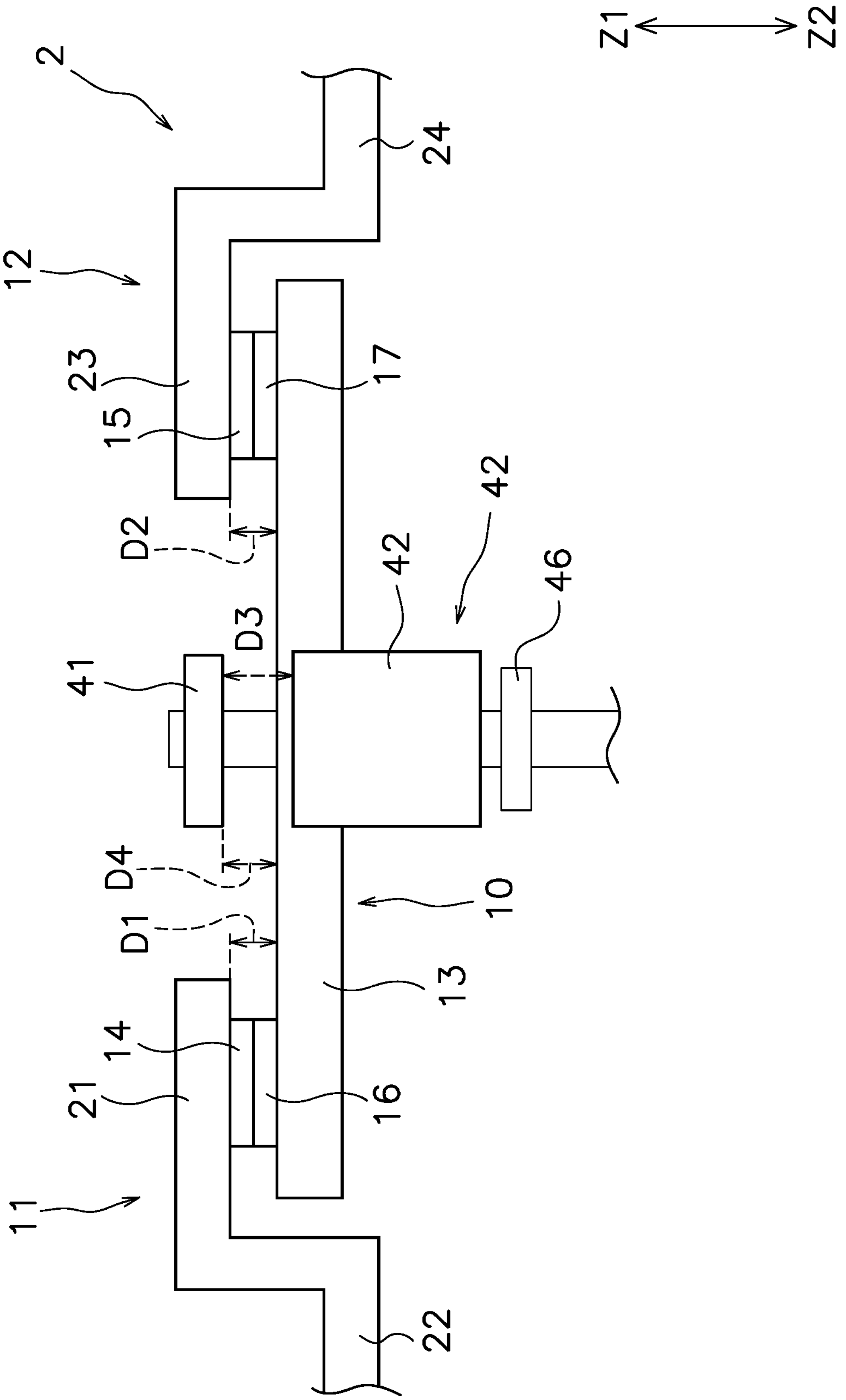
FIG. 4 is an enlarged view of the contact device when a movable contact piece is in a closed position.

FIG. 4 is an enlarged view of the contact device 2 in which the movable contact piece 10 is in the closed position. As illustrated in FIG. 4, when the movable contact piece 10 is in the closed position, the distance D3 between the first yoke 41 and the second yoke 42 in the vertical direction is larger than a sum D1 of the lengths of the first fixed contact 14 and the first movable contact 16 in the vertical direction (hereinafter referred to as "first contact length D1"). When the movable contact piece 10 is in the closed position, the distance D3 between the first yoke 41 and the second yoke 42 in the vertical direction is larger than a sum D2 of the lengths of the second fixed contact 15 and the second movable contact 17 in the vertical direction (hereinafter referred to as "second contact length D2"). When the movable contact piece 10 is in the closed position, the distance D4 between the first yoke 41 and the movable contact piece 10 in the vertical direction is larger than the first contact length D1. When the movable contact piece 10 is in the closed position, the distance D4 between the first yoke 41 and the movable contact piece 10 in the vertical direction is larger than the second contact length D2. When the movable contact piece 10 is in the closed position, the distance D3 between the first yoke 41 and the second yoke 42 in the vertical direction is larger than the distance D4 between the first yoke 41 and the movable contact piece 10 in the vertical direction . . . .

Figure 5:
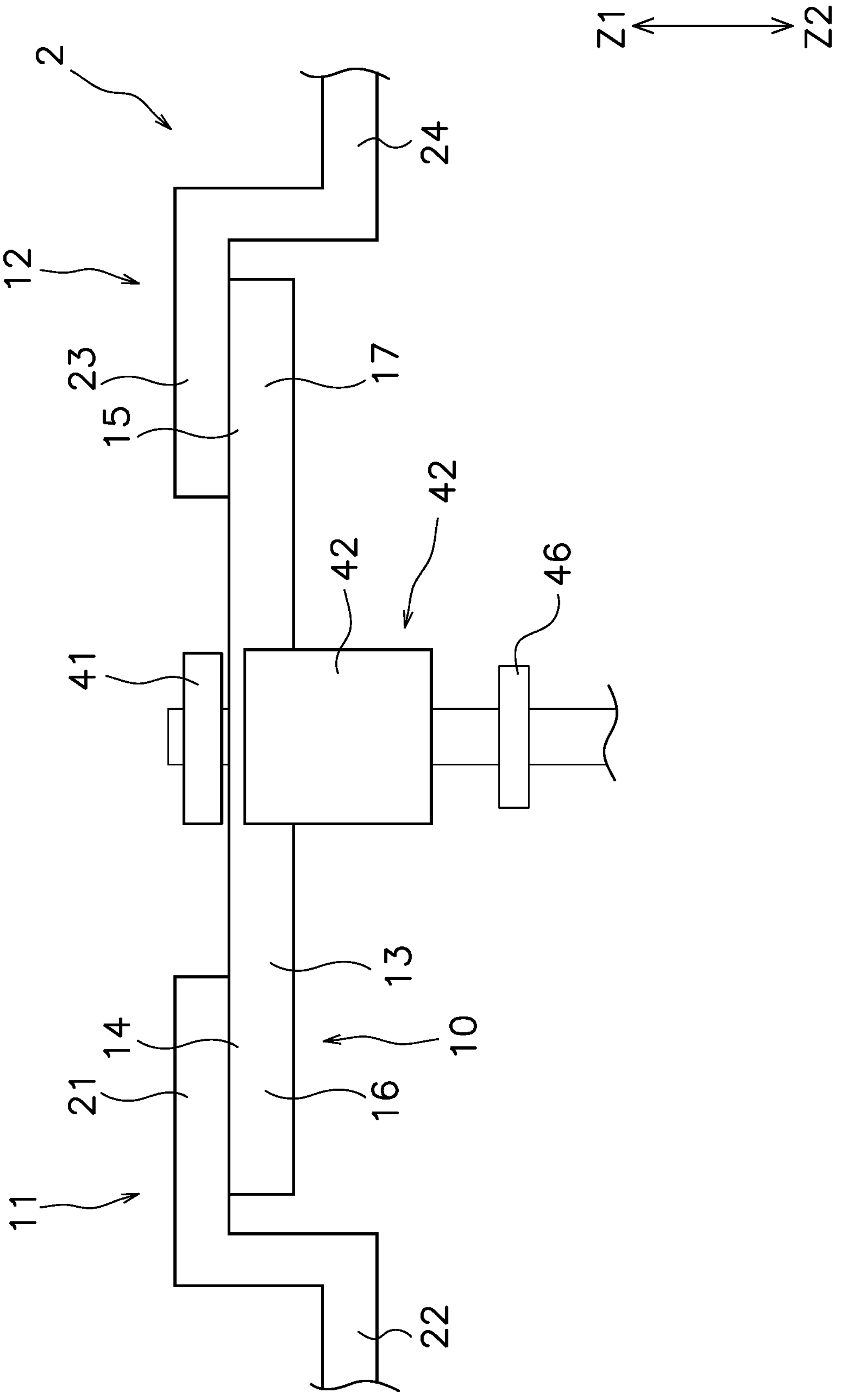
FIG. 5 is an enlarged view of the contact device in a state where the movable contact and the fixed contact are lost.

In a relay, the movable contacts 16 and 17 and the fixed contacts 14 and 15 may be lost due to an overcurrent flowing through the movable contacts 16 and 17 and the fixed contacts 14 and 15. FIG. 5 is an enlarged view of the contact device 2 in a state where the movable contacts 16 and 17 and the fixed contacts 14 and 15 are lost. When the movable contacts 16 and 17 and the fixed contacts 14 and 15 are lost, the movable contact piece 10 moves further upward from the closed position. As a result, as illustrated in FIG. 5, the movable contact piece 10 contacts the fixed terminals 11 and 12. Further, when the movable contact piece 10 moves upward, the second yoke 42 moves upward by being attracted to the first yoke 41.

As described above, the distance D3 between the first yoke 41 and the second yoke 42 is larger than the first contact length D1 and larger than the second contact length D2. Therefore, as illustrated in FIG. 5, the second yoke 42 is separated from the first yoke 41 in a state where the movable contact piece 10 contacts the fixed terminals 11 and 12, and the first yoke 41 and the second yoke 42 are not in contact with each other.

In the relay 1 according to the present embodiment described above, when the movable contact piece 10 is in the closed position, the first yoke 41 and the second yoke 42 generate a magnetic force that attracts each other. Therefore, the movable contact piece 10 is pressed in the contact direction Z1. Thereby, the contact pressure of the contacts can be improved.

By arranging the first yoke 41 and the second yoke 42 as described above, when the first fixed contact 14 and the first movable contact 16 are lost, the movable contact piece 10 can contact the first fixed terminal 11. As a result, stable energization can be ensured even if the first fixed contact 14 and the first movable contact 16 are lost. Further, when the second fixed contact 15 and the second movable contact 17 are lost, the movable contact piece 10 can contact the second fixed terminal 12. As a result, stable energization can be ensured even if the second fixed contact 15 and the second movable contact 17 are lost.

Although one embodiment of the present invention has been described above, the present invention is not limited to the above embodiment, and various modifications can be made without departing from the gist of the invention.

In the above embodiment, the drive device 4 pushes the drive shaft 19 from the drive device 4 side, so that the movable contact piece 10 moves in the contact direction Z1. Further, when the drive device 4 pulls the drive shaft 19 toward the drive device 4, the movable contact piece 10 moves in the opening direction Z2. However, the operating direction of the drive shaft 19 for opening and closing the contacts may be opposite to that of the above embodiment. That is, the movable contact piece 10 may move in the contact direction Z1 by pulling the drive shaft 19 toward the drive device 4. The movable contact piece 10 may move in the opening direction Z2 by pushing the drive shaft 19 from the drive device 4 side by the drive device 4. That is, the contact direction Z1 and the opening direction Z2 may be opposite to those of the above embodiment. In that case, the first yoke 41 and the second yoke 42 may be arranged upside down as in the above embodiment.

The shapes or arrangements of the first fixed terminal 11, the second fixed terminal 12, and the movable contact piece 10 may be changed. The shape or arrangement of the movable iron core 31, the coil 32, the fixed iron core 33, or the yoke 34 may be changed. The shapes or arrangements of the first fixed contact 14, the second fixed contact 15, the first movable contact 16, and the first fixed contact 14 may be changed.

For example, the first fixed contact 14 may be provided separately from the first contact support portion 21. Alternatively, the first fixed contact 14 may be integrated with the first contact support portion 21. The second fixed contact 15 may be provided separately from the second contact support portion 23. Alternatively, the second fixed contact 15 may be integrated with the second contact support portion 23. The first movable contact 16 and the second movable contact 17 may be provided separately from the contact piece main body 13. Alternatively, the first movable contact 16 and the second movable contact 17 may be integrated with the contact piece main body 13.

The shape or arrangement of the first yoke 41 and the second yoke 42 may be changed. FIGS. 6A, 6B, 7, and 8 are views showing a part of the configuration of the relay 1 according to the first modification. FIGS. 6A and 7 show a part of the relay 1 in which the movable contact piece 10 is in the closed position. As illustrated in FIG. 6A, in the relay 1 according to the first modification, the first yoke 41 is smaller than the gap G1 between the first wall portion 43 and the second wall portion 44 in the front-rear direction. Therefore, the first yoke 41 can be inserted into the gap G1 between the first wall portion 43 and the second wall portion 44. In other words, the first yoke 41 does not overlap the first wall portion 43 and the second wall portion 44 when viewed from the vertical direction.

As illustrated in FIG. 7, when the movable contact piece 10 is in the closed position, the distance D3 between the first yoke 41 and the second yoke 42 in the vertical direction may be smaller than the first contact length D1. When the movable contact piece 10 is in the closed position, the distance D3 between the first yoke 41 and the second yoke 42 in the vertical direction may be smaller than the second contact length D2. When the movable contact piece 10 is in the closed position, the distance D3 between the first yoke 41 and the second yoke 42 in the vertical direction is smaller than the distance D4 between the first yoke 41 and the movable contact piece 10 in the vertical direction. May be good.

Figure 6B:
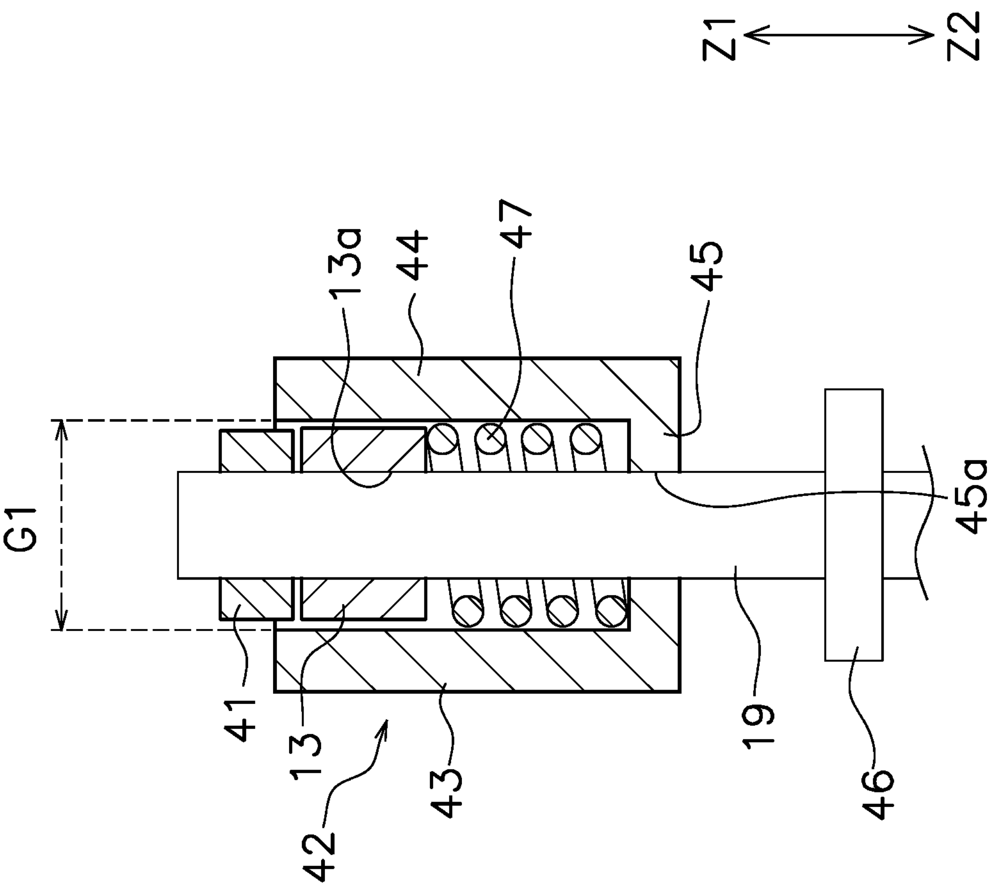
FIGS. 6A and 6B are diagrams showing a part of a structure of the relay according to a first modification.
Figure 6A:
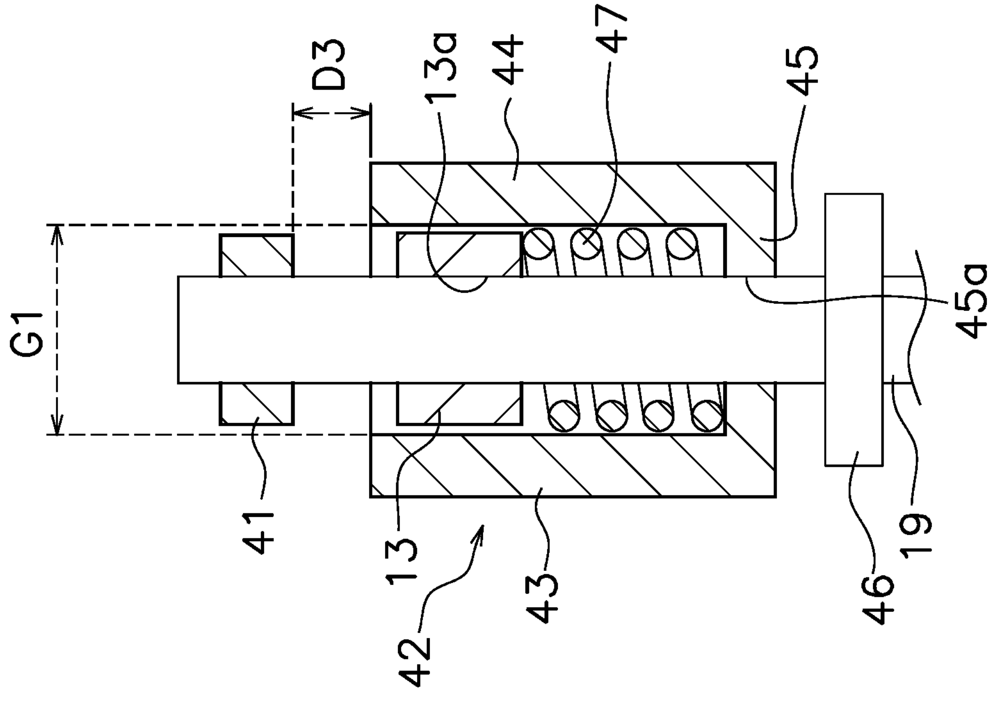
Figure 7:
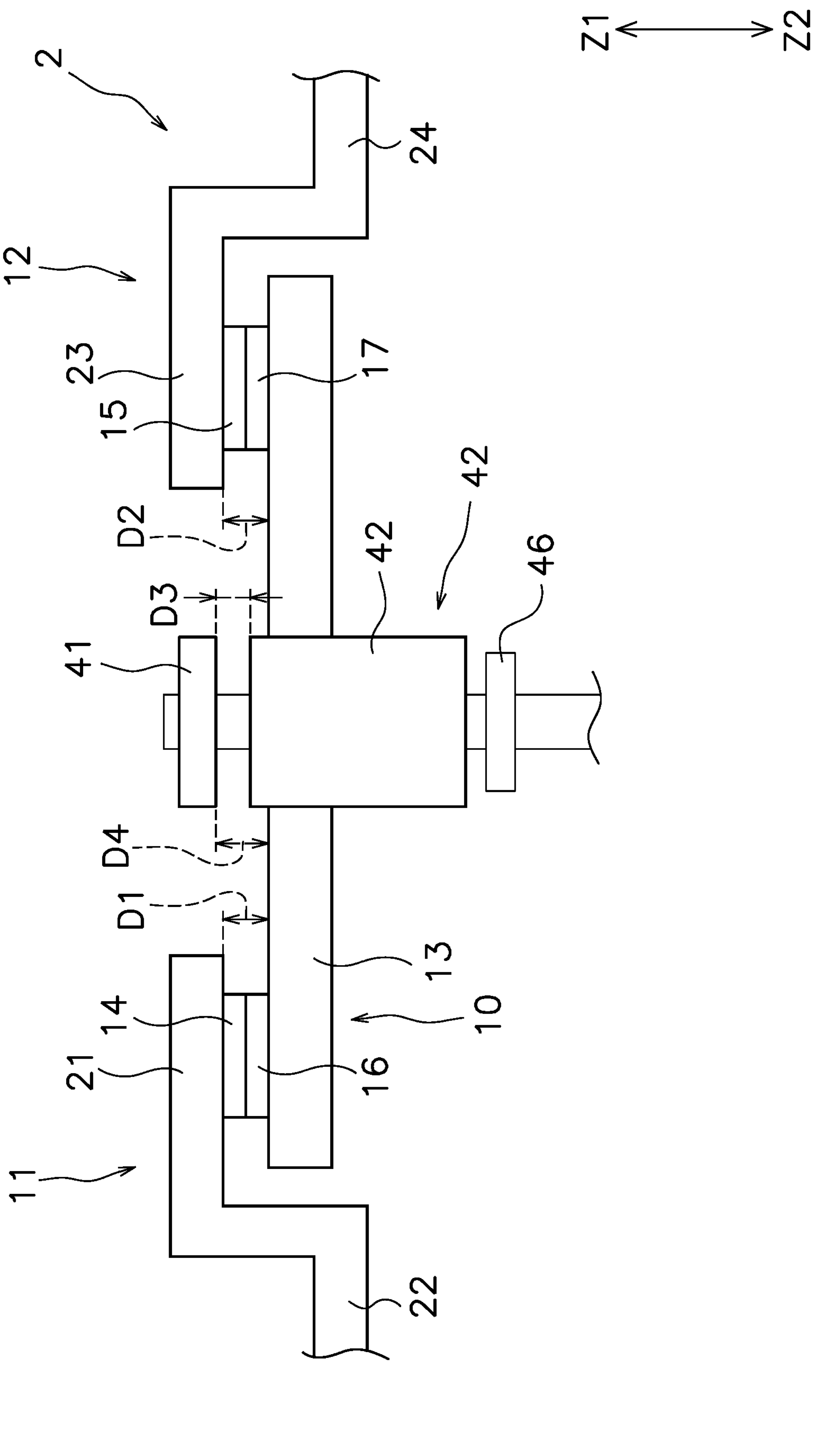
FIG. 7 is a diagram showing a part of the structure of the relay according to the first modification.
Figure 8:
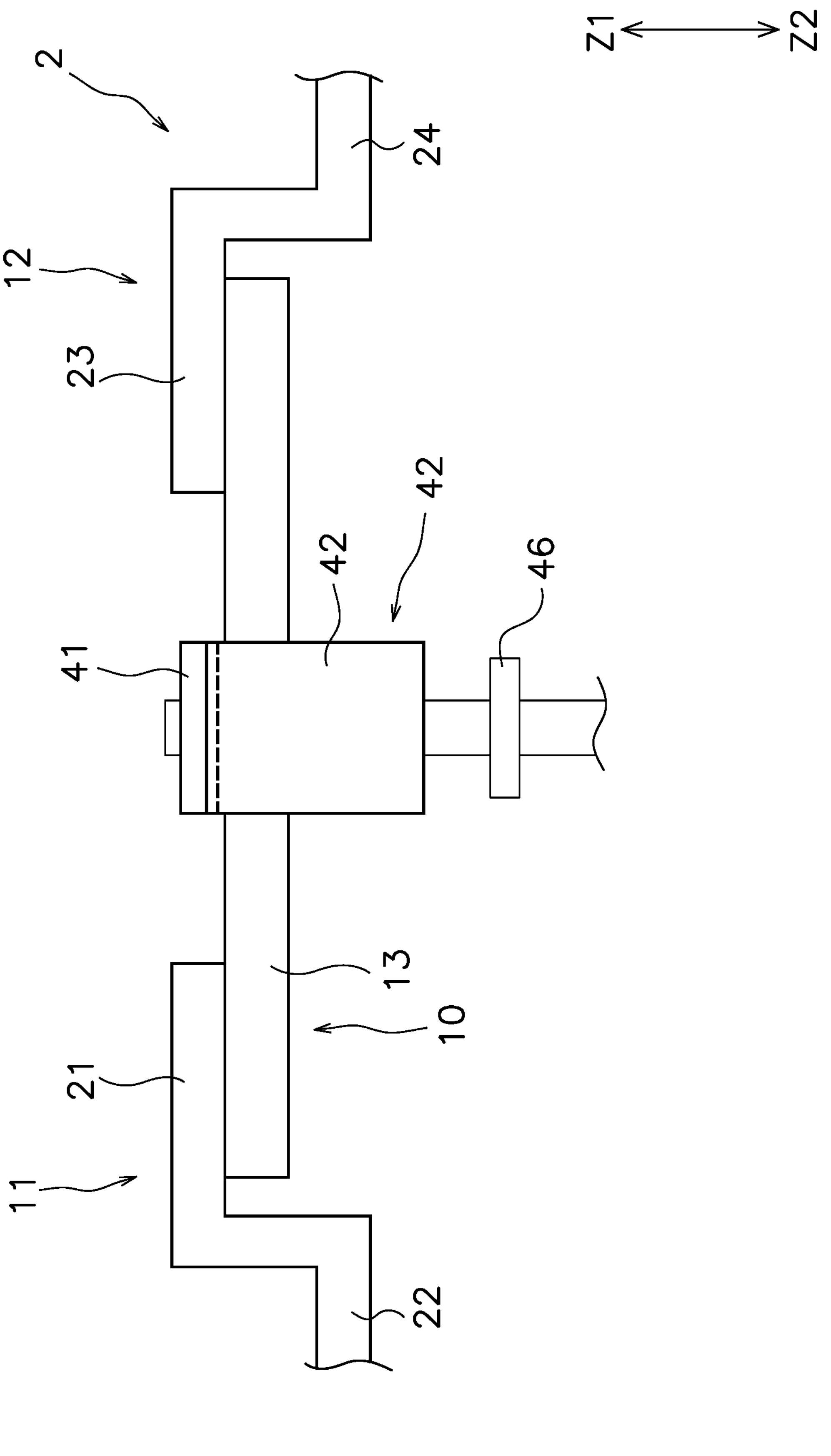
FIG. 8 is a diagram showing a part of the structure of the relay according to the first modification.

FIGS. 6B and 8 show a part of the relay 1 when the movable contacts 16 and 17 and the fixed contacts 14 and 15 are lost. When the movable contacts 16 and 17 and the fixed contacts 14 and 15 are lost, the movable contact piece 10 moves further upward from the closed position. As a result, as illustrated in FIG. 8, the movable contact piece 10 contacts the fixed terminals 11 and 12. Further, when the movable contact piece 10 moves upward, the second yoke 42 moves upward by being attracted to the first yoke 41.

As described above, the first yoke 41 can be inserted into the gap G1 between the first wall portion 43 and the second wall portion 44. Therefore, as illustrated in FIG. 6B, the first yoke 41 is inserted between the first wall portion 43 and the second wall portion 44 in a state where the movable contact piece 10 contacts the fixed terminals 11 and 12. As a result, the movable contact piece 10 can contact the fixed terminals 11 and 12 without being interfered by the first yoke 41 and the second yoke 42.

Figure 9:
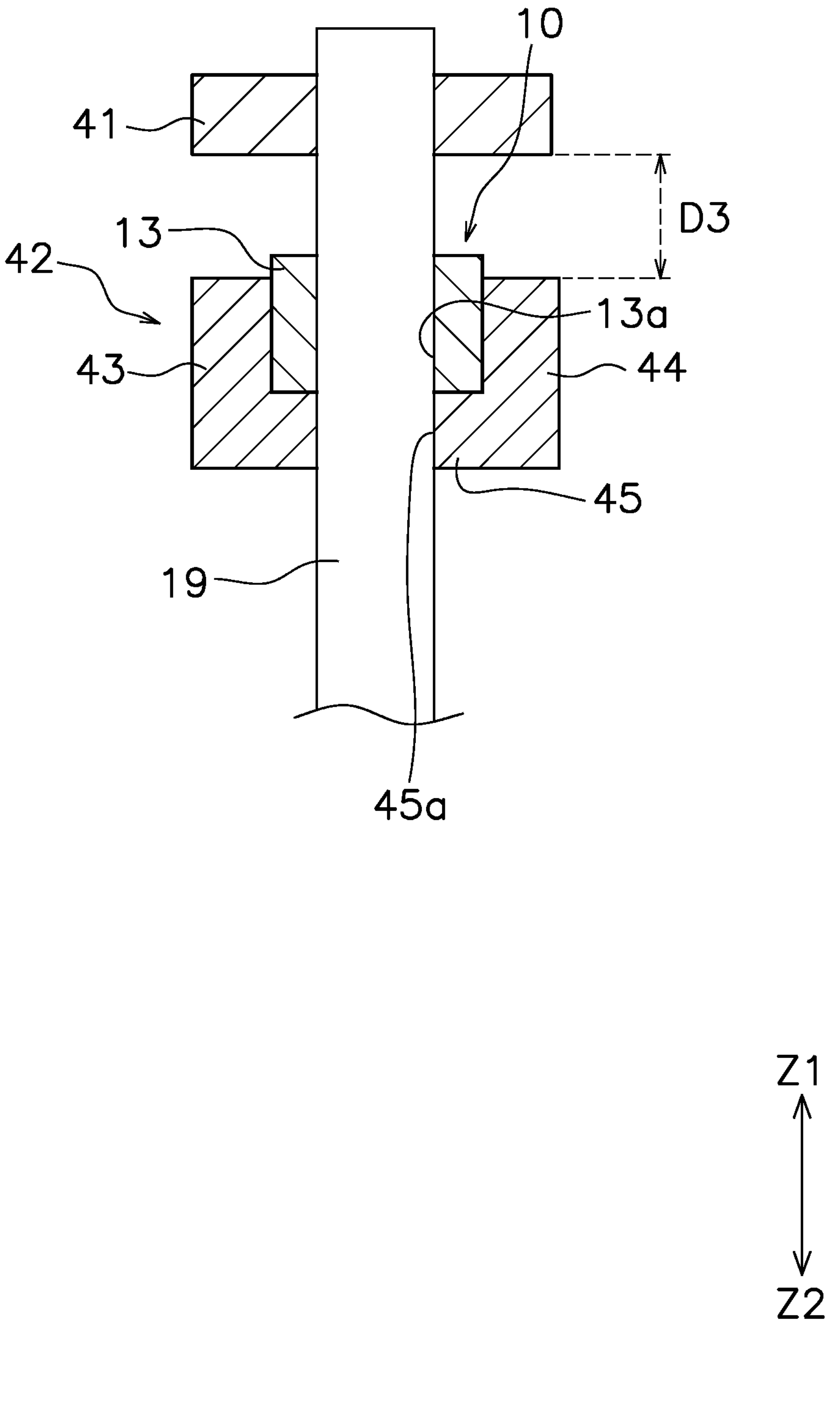
FIG. 9 is a diagram showing a part of the structure of the relay according to a second modification.

FIG. 9 is a diagram showing a part of the relay 1 according to the second modification. As illustrated in FIG. 9, the second yoke 42 may be fixed to the movable contact piece 10. The second yoke 42 may be movable in the vertical direction with respect to the drive shaft 19 together with the movable contact piece 10. In this case, the spring 47 may be omitted. Other configurations are the same as those in the above embodiment.

Figure 10:
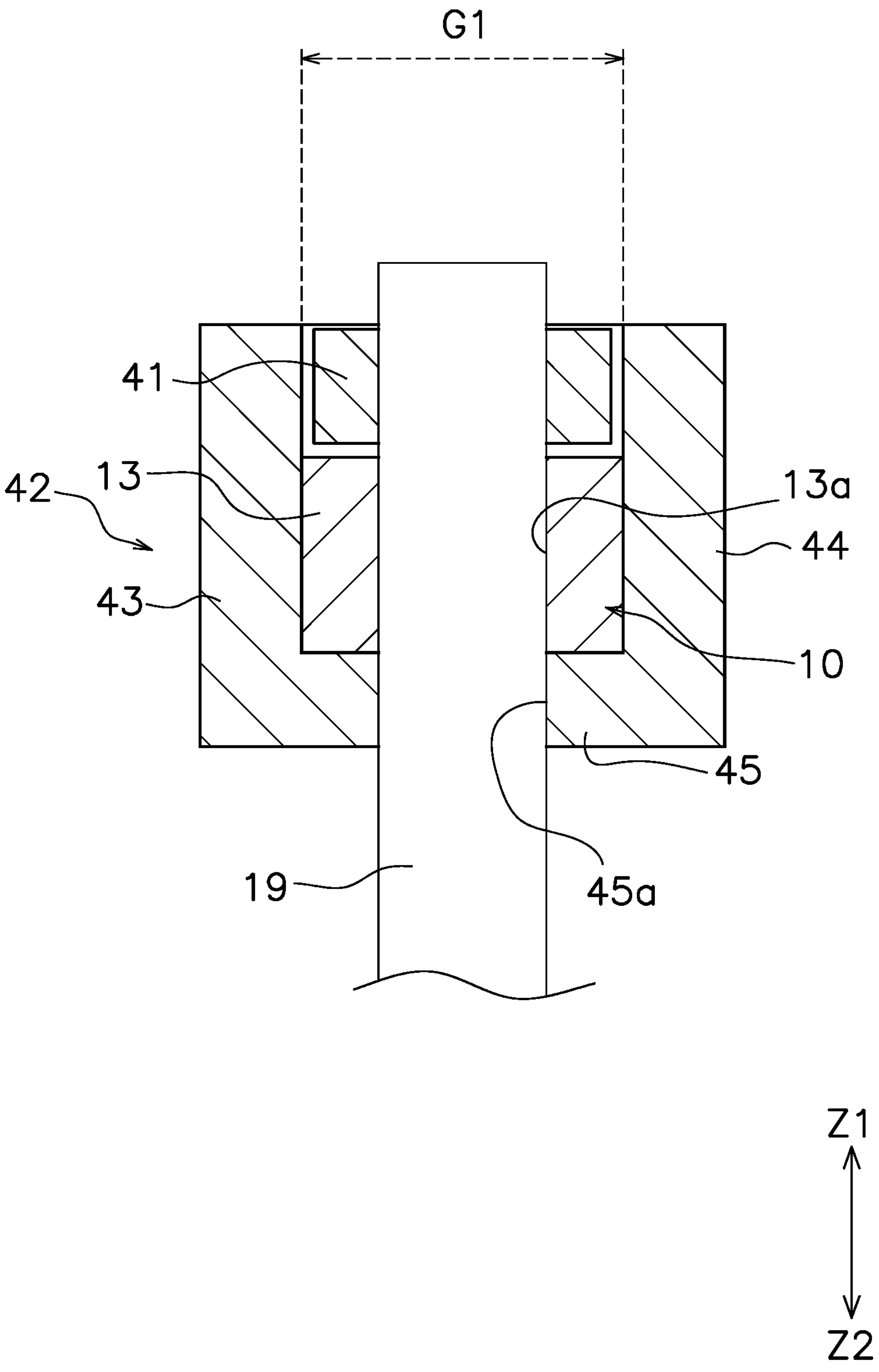
FIG. 10 is a diagram showing a part of the structure of the relay according to the third modification.

FIG. 10 is a diagram showing a part of the relay 1 according to the third modification. As illustrated in FIG. 10, the second yoke 42 may be fixed to the movable contact piece 10. The second yoke 42 may be movable in the vertical direction with respect to the drive shaft 19 together with the movable contact piece 10. In this case, the spring 47 may be omitted. Other configurations are the same as in the first modification.

Figure 11:
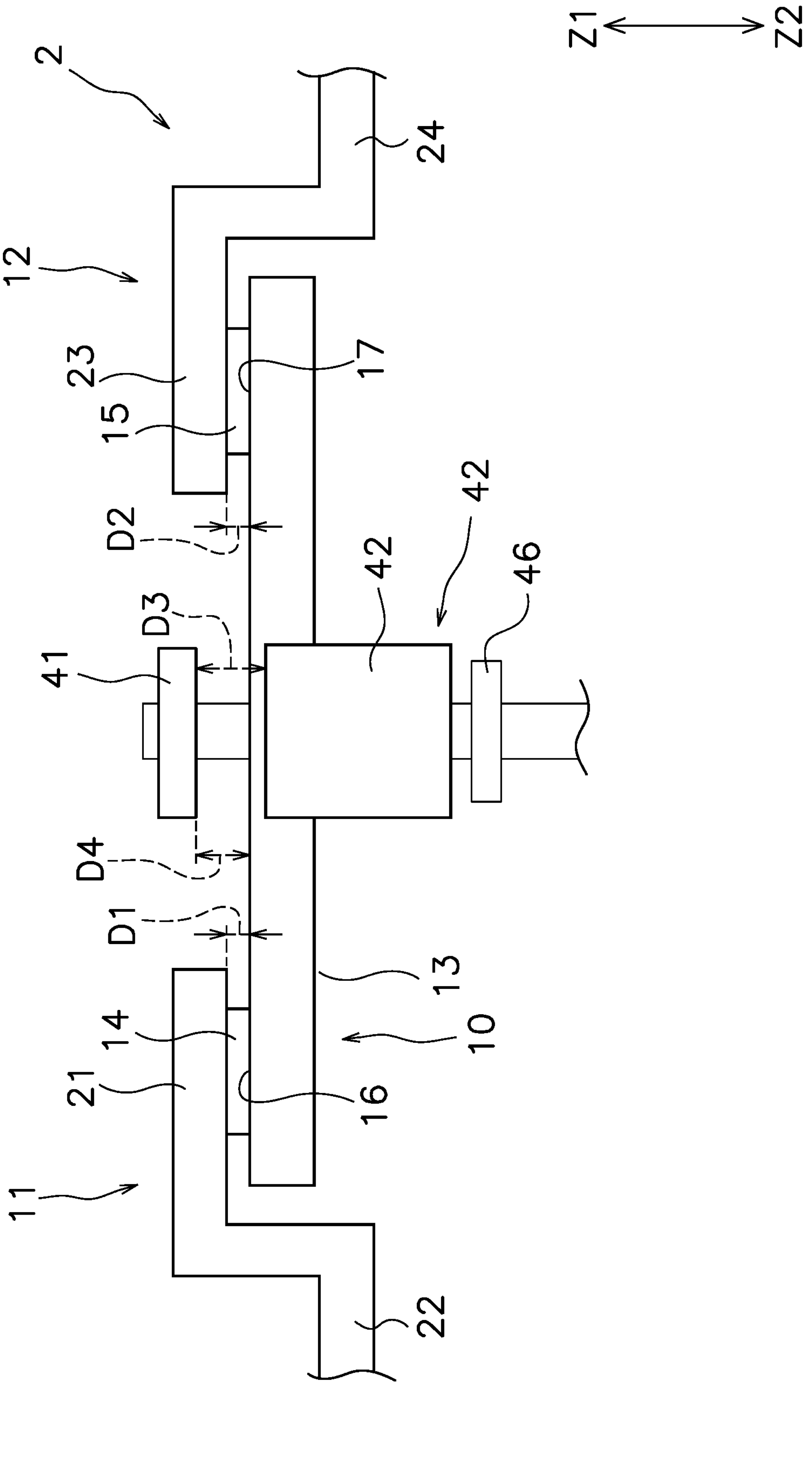
FIG. 11 is a diagram showing a part of the structure of the relay according to the fourth modification.

In the above embodiment, the first movable contact 16 and the second movable contact 17 have a shape protruding from the contact piece main body 13. However, as in the fourth modification illustrated in FIG. 11, the first movable contact 16 and the second movable contact 17 may be provided flush with the contact piece main body 13. That is, the first movable contact 16 may be a part of the contact piece main body 13 that contacts the first fixed contact 14. The second movable contact 17 may be a part of the contact piece main body 13 that contacts the second fixed contact 15.

Figure 12:
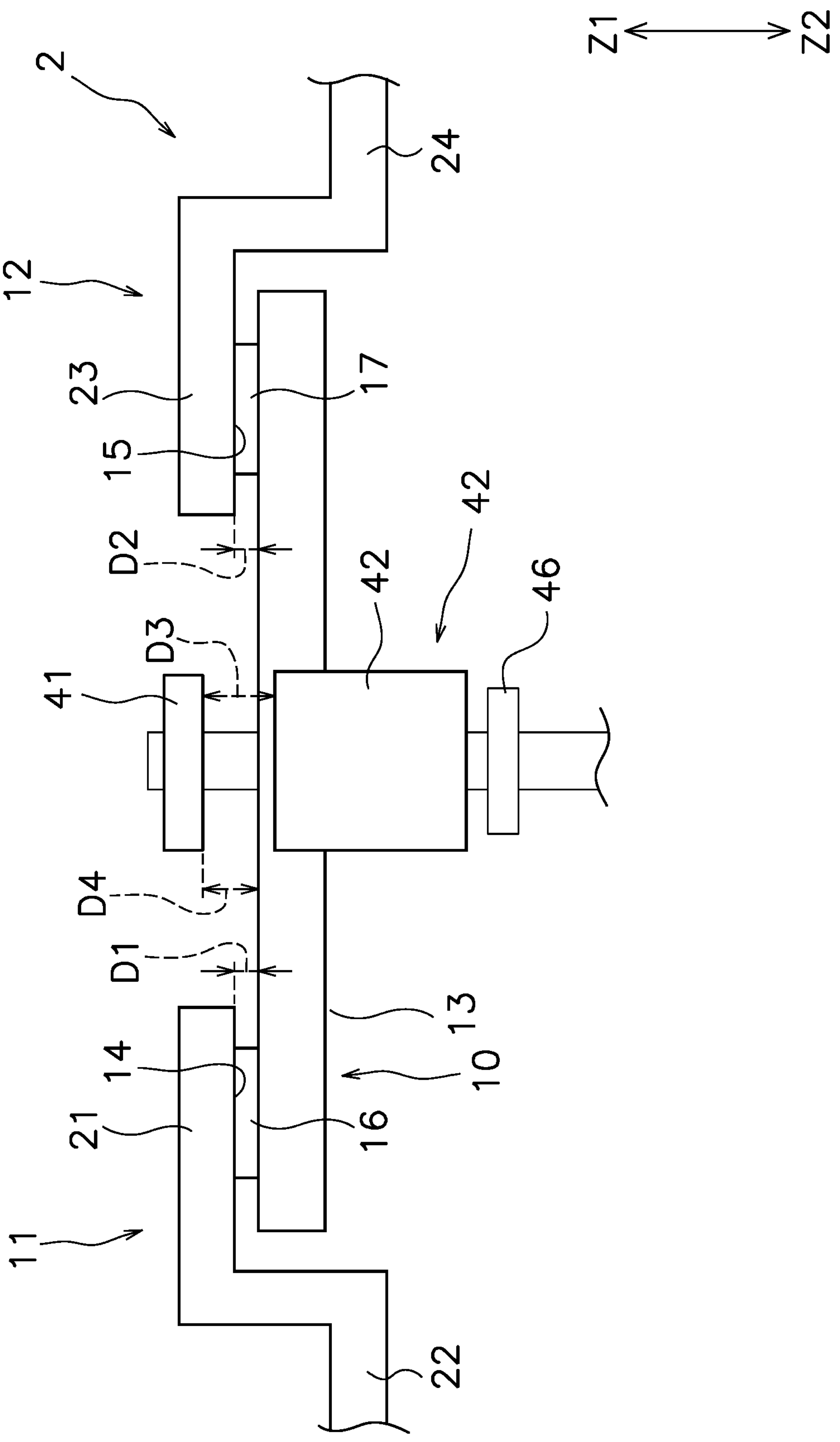
FIG. 12 is a diagram showing a part of the structure of the relay according to the fifth modification.

In the above embodiment, the first fixed contact 14 has a shape protruding from the first contact support portion 21. The second fixed contact 15 has a shape protruding from the second contact support portion 23. However, as in the fifth modification illustrated in FIG. 12, the first fixed contact 14 may be provided flush with the first contact support portion 21. The second fixed contact 15 may be provided flush with the second contact support portion 23. That is, the first fixed contact 14 may be a part of the first contact support portion 21 that contacts the first movable contact 16. The second fixed contact 15 may be a part of the second contact support portion 23 that contacts the second movable contact 17.

REFERENCE SIGNS LIST

4 Drive device
10 Movable contact piece
11, 12 Fixed terminals
14,15 Fixed contacts
16,17 Movable contacts
41 first yoke
42 Second yoke
43 First wall
44 Second wall

The invention claimed is:

1. A relay comprising:
a movable contact piece including a movable contact;
a fixed terminal including a fixed contact arranged to face the movable contact;
a drive device configured to move the movable contact piece in a moving direction, the moving direction including a contact direction in which the movable contact is close to the fixed contact and an opening direction in which the movable contact separates from the fixed contact;
a first yoke arranged in the contact direction with respect to the movable contact piece; and
a second yoke arranged in the opening direction with respect to the movable contact piece,
the first yoke and the second yoke being configured to generate a magnetic force that attracts the first yoke and the second yoke to each other when the movable contact contacts the fixed contact and is energized, and
the movable contact piece being configured to contact the fixed terminal without the first yoke and the second yoke contacting each other in a state where the movable contact and the fixed contact are lost or have disappeared.

2. The relay according to claim 1, wherein
in the moving direction of the movable contact piece, a distance between the first yoke and the second yoke when the movable contact contacts the fixed contact is greater than a sum of lengths of the fixed contact and the movable contact.

3. The relay according to claim 1, wherein
the second yoke is separated from the first yoke when the movable contact and the fixed contact are lost and the movable contact piece contacts the fixed terminal.

4. The relay according to claim 1, wherein
the second yoke includes a first wall portion and a second wall portion,
the first wall portion and the second wall portion are arranged apart from each other, and
the first yoke is located between the first wall portion and the second wall portion when the movable contact and the fixed contact are lost and the movable contact piece contacts the fixed terminal.

5. The relay according to claim 4, wherein
the first wall portion and the second wall portion are arranged apart from each other in a first direction perpendicular to the moving direction of the movable contact piece, and
in the first direction, the first yoke is smaller than a gap between the first wall portion and the second wall portion.

* * * * *